United States Patent
Schulz-Weiling (10) Patent No.: US 11,485,329 B2
(45) Date of Patent: Nov. 1, 2022

(54) EMERGENCY HALT METHOD AND DEVICE FOR A VEHICLE DRIVING AT LEAST PARTIALLY IN AUTOMATED FASHION

(71) Applicant: Robert Bosch GmbH, Stuttgart (DE)

(72) Inventor: Markus Schulz-Weiling, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 16/710,860

(22) Filed: Dec. 11, 2019

(65) Prior Publication Data

US 2020/0198599 A1 Jun. 25, 2020

(30) Foreign Application Priority Data

Dec. 20, 2018 (DE) .......................... 102018222556.7

(51) Int. Cl.
| | |
|---|---|
| *B60W 50/10* | (2012.01) |
| *B60W 50/00* | (2006.01) |
| *B60T 7/12* | (2006.01) |
| *B60W 30/09* | (2012.01) |

(52) U.S. Cl.
CPC .............. *B60T 7/12* (2013.01); *B60W 50/10* (2013.01); *B60W 30/09* (2013.01); *B60W 2050/0075* (2013.01); *B60W 2540/215* (2020.02); *B60W 2556/45* (2020.02)

(58) Field of Classification Search
None
See application file for complete search history.

(56) References Cited

U.S. PATENT DOCUMENTS

| | | | | |
|---|---|---|---|---|
| 8,527,139 B1* | 9/2013 | Yousuf | ................ | G06F 11/2242 701/32.8 |
| 10,611,384 B1* | 4/2020 | VandenBerg, III | ... | B60W 50/14 |
| 2002/0007235 A1* | 1/2002 | Hwang | ..................... | B60L 3/04 701/23 |
| 2004/0124707 A1* | 7/2004 | Boggs | ..................... | B60R 25/04 307/10.5 |
| 2007/0198145 A1* | 8/2007 | Norris | .................... | G05D 1/021 701/23 |

(Continued)

FOREIGN PATENT DOCUMENTS

| | | |
|---|---|---|
| DE | 102018103181 A1 | 8/2018 |
| DE | 102017208582 A1 | 11/2018 |

(Continued)

OTHER PUBLICATIONS

Andreas et al. (Machine Translation of DE 102009001376), obtained from https://patentscope.wipo.int/search/en/detail.jsf?docId=DE104886236&_cid=P22-L0VEVQ-71791-1 on Mar. 17, 2022, all. (Year: 2010).*

*Primary Examiner* — James J Lee
*Assistant Examiner* — Tawri M Matsushige
(74) *Attorney, Agent, or Firm* — Norton Rose Fulbright US LLP; Gerard Messina (57) ABSTRACT

An emergency halt method for a vehicle driving at least partially in automated fashion. The method includes receiving an emergency halt signal; providing a blocking signal, a first control unit being blocked, and the control over controlling driving maneuvers of the vehicle being withdrawn from the first control unit; and providing a not-drive signal for starting an emergency halt maneuver of the vehicle.

12 Claims, 4 Drawing Sheets

(56) References Cited

U.S. PATENT DOCUMENTS

| | | | |
|---|---|---|---|
| 2010/0117585 A1* | 5/2010 | Fitch | B25J 13/06 |
| | | | 361/114 |
| 2014/0277846 A1* | 9/2014 | Meister | F02N 11/0818 |
| | | | 701/2 |
| 2015/0120124 A1* | 4/2015 | Bartels | B60W 50/14 |
| | | | 701/23 |
| 2016/0219028 A1* | 7/2016 | Baltes | H04W 4/40 |
| 2017/0057510 A1* | 3/2017 | Herbach | B62D 15/0265 |
| 2017/0268202 A1* | 9/2017 | Matsuzaki | G05D 1/0278 |
| 2018/0188726 A1* | 7/2018 | Newman | B60W 50/00 |
| 2019/0001941 A1* | 1/2019 | Westlund | B60T 8/1701 |
| 2019/0129416 A1* | 5/2019 | Upmanue | B60W 40/08 |
| 2019/0220004 A1* | 7/2019 | Von Novak, III | B63H 21/21 |
| 2019/0235487 A1* | 8/2019 | Zhao | H04W 4/44 |
| 2019/0324450 A1* | 10/2019 | Lurie | H04L 9/3247 |
| 2019/0337526 A1* | 11/2019 | Rave | G06F 21/74 |
| 2020/0201323 A1* | 6/2020 | Park | B60W 50/04 |
| 2021/0171062 A1* | 6/2021 | Hecker | B60W 50/023 |

FOREIGN PATENT DOCUMENTS

| | | |
|---|---|---|
| DE | 102017222625 A1 | 6/2019 |
| WO | 2018065973 A1 | 4/2018 |

* cited by examiner

EMERGENCY HALT METHOD AND DEVICE FOR A VEHICLE DRIVING AT LEAST PARTIALLY IN AUTOMATED FASHION

CROSS REFERENCE

The present application claims the benefit under 35 U.S.C. § 119 of German Patent Application No. DE 102018222556.7 filed on Dec. 20, 2018, which is expressly incorporated herein by reference in its entirety.

FIELD

The present invention relates to an emergency halt method and to a device for a vehicle driving at least partially in automated fashion, to a computer program as well as to a computer-readable storage medium.

BACKGROUND INFORMATION

In larger passenger vehicles, a device is may be included for emergency braking, the so-called emergency stop, which is triggered by the passenger in the event of unforeseen hazards (e.g., fire or medical emergency). The emergency brake in this context fulfills two essential functions: The vehicle is to be brought to a stop as quickly as possible, and the vehicle operator is to be alerted to an emergency situation. Normally, the operation of the emergency brake does not directly result in emergency braking. In trains, for example, the train driver is notified and brings the train to a standstill at the next safe location (e.g., not on bridges or in tunnels). The unjustified operation of the emergency brake is a punishable offense and the course of events of the triggering is investigated following the operation. Such emergency stop systems are normally equipped with locking mechanisms, which permit a renewed operation only after unlocking and/or acknowledgment by technical staff on site. In the operation of at least partially automated vehicles (or autonomous vehicles (AV)), there is no technical staff on the site of the vehicle. The driver is replaced by a drive computer.

Thus, there exists the demand for an extension of the emergency stop function, as well as a corresponding release and acknowledgment for vehicles driving at least partially in automated fashion.

SUMMARY

In accordance with the present invention, an example emergency halt method is provided for a vehicle driving at least partially in automated fashion. The example method includes:
receiving an emergency halt signal;
providing a blocking signal, a first control unit being blocked in the process, and the control over controlling driving maneuvers of the vehicle being withdrawn from the control unit; and
providing a not-drive signal for starting an emergency halt driving maneuver of the vehicle.

In addition to a usual emergency stop signal, in response to which the vehicle is to be brought to a stop as quickly as possible, and the vehicle driver or a computer system is to be alerted to an emergency situation, it is possible to receive an emergency halt signal. It is thus possible to distinguish between an emergency stop and an emergency halt.

In an emergency stop, the first control unit designed for controlling the driving maneuvers of the vehicle is instructed to perform an emergency stop. This may be prevented, however, by a malfunction of the first control unit or a manipulation of the first control unit, for example by a hacker attack. An emergency halt by contrast offers in particular the passenger of the vehicle the possibility of directly influencing the driving maneuver of the vehicle and to bring the vehicle to a standstill irrespective of a malfunction or a manipulation of the first control unit. The emergency halt is controlled by the second control unit, while the emergency stop is controlled by the first control unit.

Because the control is withdrawn from the first control unit, malfunctions and/or manipulations of the first control unit no longer affect driving maneuvers of the vehicle. A second control unit is then solely responsible for the driving maneuvers of the vehicle and is designed to start an emergency halt, for example by performing a full braking action.

The first control unit and the second control unit preferably may also be developed as a single control unit.

According to another aspect, the emergency halt signal is provided by a passenger of the vehicle.

In this manner, the passenger of the vehicle operating at least partially in automated fashion is offered the possibility of influencing the driving maneuver of the vehicle directly in the event of an emergency.

According to another aspect, the emergency halt driving maneuver comprises a full braking action of the vehicle.

Advantageously, in the event of an emergency, an attempt is first made to bring the vehicle to an emergency stop. In this instance, for safety reasons, a full braking action is not attempted directly, but rather the system waits for a suitable stoppage situation. For this reason, in an emergency halt driving maneuver, which is normally started only after a failed emergency stop driving maneuver, a full braking action of the vehicle is started directly. Fundamentally, however, a specific embodiment is also possible in which the emergency halt driving maneuver also comprises more complex driving maneuvers.

According to another aspect, the example emergency halt method includes:
receiving a release signal for releasing the blocked driving control unit
receiving an acknowledgment signal for acknowledging the release signal; and
canceling the blocking signal, the first control unit being released in the process, and the control over controlling the driving maneuvers being given to the first control unit.

Following the execution of an emergency halt, the vehicle must be released in order to take up its function again, the at least partially automated driving.

A sole release signal, either only from the passenger or only from a station outside the vehicle, allows for manipulations or misuse of the release signal. Thus, the initiation of an unnecessary emergency halt by a passenger represents a punishable act, which must be prosecuted. On the other hand, it is possible for a station outside the vehicle falsely to provide a release signal as a result of a malfunction or an external manipulation.

The combination of a release signal from a station outside the vehicle and an acknowledgment signal from a passenger makes it possible to implement a controlled release of the first control unit.

In this manner, the passenger ultimately retains control over the vehicle. Furthermore, an acknowledgment of the emergency halt may be given without technical staff on site at the vehicle.

According to another aspect of the present invention, the release signal is provided by a station outside the vehicle, preferably by a control station.

The station outside the vehicle preferably evaluates the situation and, if indicated, releases the vehicle again.

Preferably, the release signal may also be provided by the vehicle itself, in particular by a vehicle computer. Nevertheless, an acknowledgment of the release signal by the passenger would still be needed.

According to another aspect of the present invention, the acknowledgment signal is provided by the passenger of the vehicle.

In this manner, the passenger continues to retain the final decision and is better protected against malfunction or manipulation.

The provided control unit is designed to execute steps of the described method.

The control unit is preferably designed as a processor.

When executed on a processor, the provided computer program instructs the processor to perform steps of a described method.

A computer-readable storage medium is provided on which a described computer program is stored.

DETAILED DESCRIPTION OF EXAMPLE EMBODIMENTS

Figure 1:
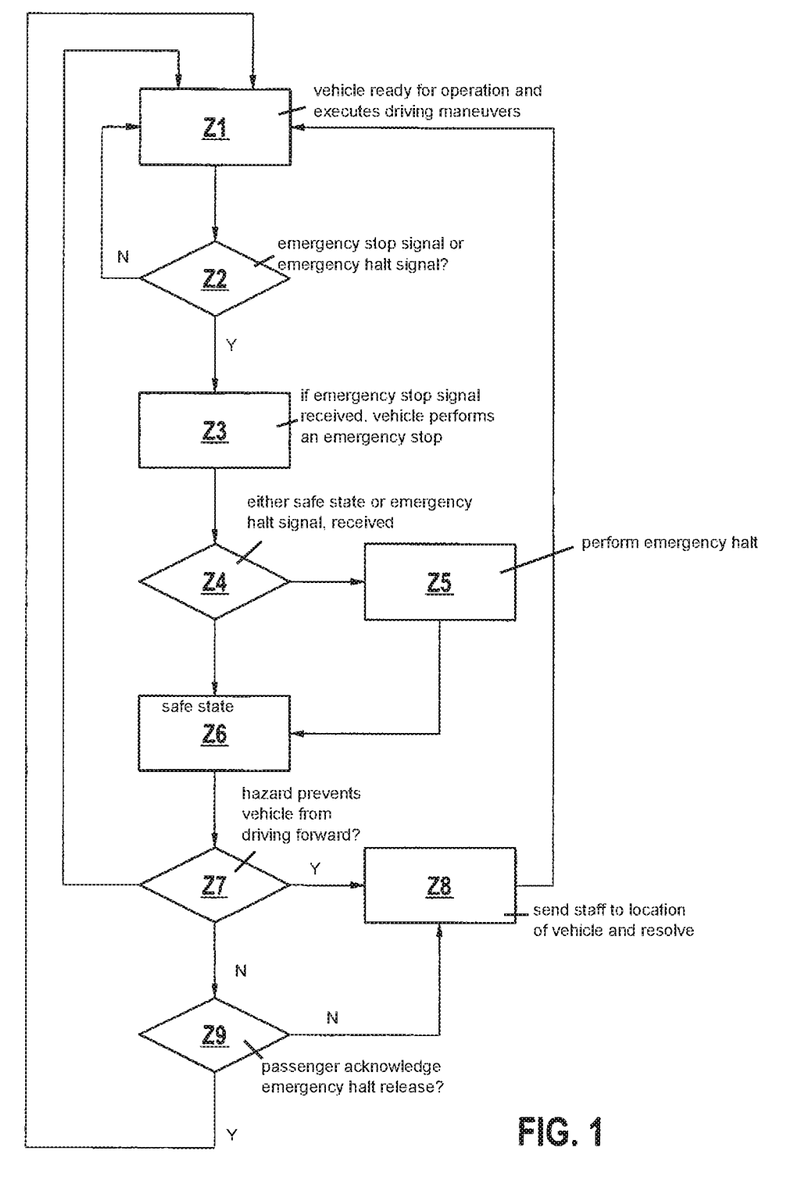
FIG. 1 shows a diagram of a sequence of an emergency stop and an emergency halt.

FIG. 1 shows a flow chart of a vehicle driving at least partially in automated fashion for starting an emergency stop and for starting an emergency halt.

In state Z1, the vehicle driving at least partially in automated fashion is ready for operation and executes driving maneuvers in accordance with a driving strategy.

In state Z2, a check is performed to determine whether an emergency stop signal NH or an emergency halt signal NS was received. If no signal at all was received, the operational readiness of the vehicle does not change and the method starts again in state Z1.

If an emergency stop signal NH is received, then the vehicle performs an emergency stop in state Z3. For this purpose, the vehicle attempts to reach a safe state. A safe state would be for example parking the vehicle in a parking bay or in a driveway. After receiving the emergency stop signal, the method jumps to state Z4. The emergency stop signal NH is preferably provided by a passenger of the vehicle. A typical situation would be for example a health emergency situation of the passenger. By providing an emergency stop signal NH, the passenger is able to achieve a stoppage of the vehicle that is preferably quick, but safe.

As long as the vehicle has not reached a safe state, the method is in state Z4. Either a safe state is reached, in which case the method jumps to state Z6, or for certain reasons no safe state is reached, for example because of malfunction or manipulation of the vehicle. The passenger is able to gain control over the vehicle by an emergency halt signal NS. If an emergency halt signal NS is received, the vehicle performs an emergency halt in state Z4. For this purpose, usually an immediate full braking action is performed and the vehicle is brought to a standstill as quickly as possible. Subsequently, the method jumps to state Z6. The emergency halt signal NS is preferably provided by the passenger. By providing the emergency halt signal NS, the passenger is able to achieve an immediate stoppage of the vehicle.

In state Z6, the vehicle has a speed of zero and a control station checks the reason for the emergency stop or the reason for the emergency halt. Subsequently, based on the analysis, a decision is made according to state Z7.

If the control station in state Z7 concludes that there continues to exist a hazard that prevents the vehicle from driving further, the method jumps from state Z7 to state Z8.

In state Z8, technical staff and/or emergency staff is sent to the location of the vehicle in order to resolve the situation. Only when the technical staff and/or the emergency staff on site at the vehicle has resolved the situation, that is, the emergency state, the method jumps from state Z8 to state Z1. The vehicle is then again ready for operation.

If the control station in state Z7 concludes that the emergency state is resolved and it is a case of an emergency stop, then the control station grants an emergency stop release, and the method jumps from state Z7 to state Z1. As a result of the emergency stop release, the vehicle is again ready for operation.

If the control station in state Z7 concludes that the emergency state has been resolved and it is a case of an emergency halt, then the control station grants an emergency halt release in the form of a release signal FS, and the method jumps from state Z7 to state Z9. In the event of an emergency halt, the method is able to jump from state Z7 only to state Z9. The other two paths are excluded by the vehicle-internal logic circuit.

In state Z9, a passenger of the vehicle is requested to acknowledge the emergency halt release of the control station by an acknowledgment signal QS.

If the passenger regards the emergency state as not resolved, the passenger does not grant acknowledgment. The method jumps from state Z9 to state Z8.

If the passenger regards the emergency state likewise as resolved, the passenger grants his acknowledgment by acknowledgment signal QS. Thus both the release signal FS of the control station as well as the acknowledgment signal QS of the passenger are provided and the method jumps from state Z9 to state Z1. The vehicle is now ready again for operation.

Figure 2:
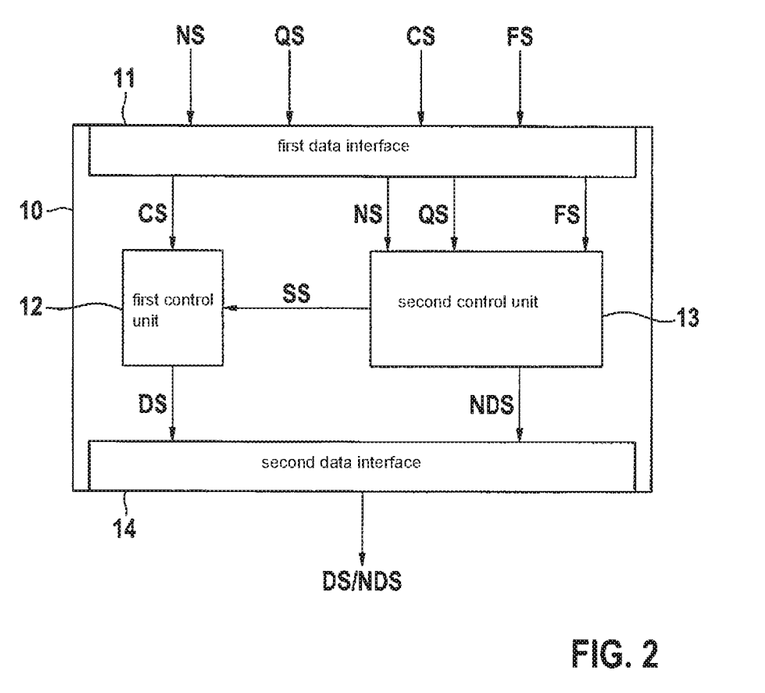
FIG. 2 shows a schematic representation of a device for operating a vehicle driving at least partially in automated fashion.

FIG. 2 shows a device 10 comprising a first data interface 11, a second data interface 14, a first control unit 12 and a second control unit 13.

First control unit 12 controls the driving maneuvers of the vehicle driving at least partially in automated fashion. To this end, first control unit 12 transmits a drive signal DS to second data interface 14, which forwards the drive signal DS to the components respectively responsible for executing the driving maneuvers. First control unit 12 is supplied by first data interface 11 with a control signal CS. Control signal CS is provided by a control station and allows the control station to adapt the driving strategy of the first control unit.

If for example a hacker takes control of control unit 12, in particular by manipulating control signal CS, then a passenger is no longer able to influence the vehicle via a possible emergency stop signal NH. The passenger would thus be a prisoner in a moving vehicle.

By providing an emergency halt signal NS to first data interface 11, it is possible to supply second control unit 13 with emergency halt signal NS. Second control unit 13 generates a blocking signal SS, which is provided to first control unit 12. Blocking signal SS withdraws control over controlling driving maneuvers of the vehicle from first control unit 11. A hacker, for example, is thus no longer able to influence the driving maneuvers of the vehicle. The second control unit additionally generates a not-drive signal NDS, which is distributed via second data interface 12 to the responsible components and starts a full braking action of the vehicle. In this manner, the vehicle is brought to a standstill directly under the control of the passenger. An operation of the vehicle is for the moment no longer possible, without an acknowledged release being granted.

In order to make the vehicle again ready for operation following an emergency halt, the control station, via a release signal FS to first data interface 11, signals that from its perspective an emergency situation no longer obtains. The passenger is prompted to provide an acknowledgment signal QS in response to release signal FS and to acknowledge the release to the control station. Only when second control unit 13 has received a release signal FS and an acknowledgment signal QS via first data interface 11, blocking signal SS to first control unit 12 is canceled and the vehicle is again ready for operation.

Accordingly, it must also be ensured that the acknowledgment signal QS can only be generated by the passenger. Furthermore, a direct unchangeable connection must exist between an operating device 15 for generating the acknowledgment signal QS and second control unit 13. The function of the emergency halt of second control unit 13 must likewise not be modifiable from outside.

Figure 3A:
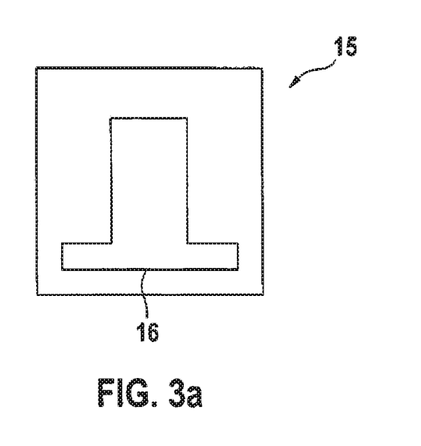
FIG. 3a shows an operating device in a first operating state.
Figure 3B:
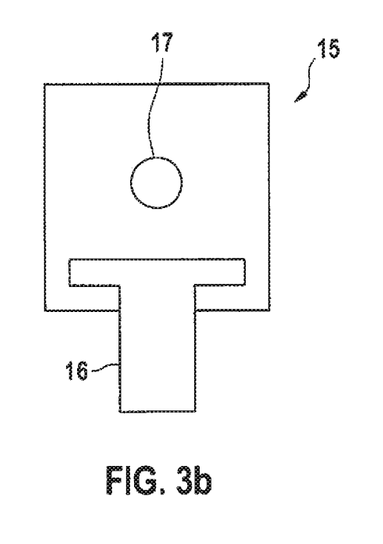
FIG. 3b shows an operating device in a second operating state.
Figure 3C:
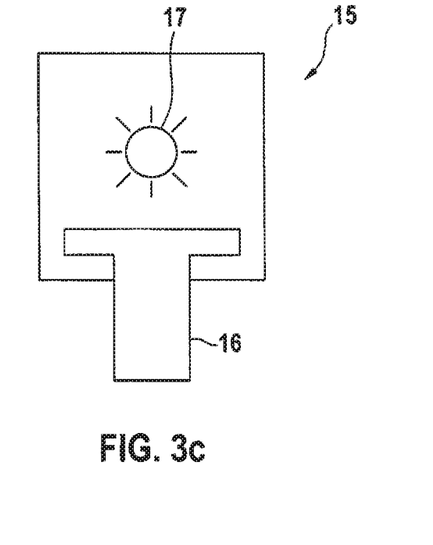
FIG. 3c shows an operating device in a third operating state.

FIGS. 3a through 3c respectively show an operating device 15, with the aid of which a passenger is able to provide his inputs, that is, generate an emergency stop signal NH, an emergency halt signal NS and/or an acknowledgment signal QS. Operating device 15 comprises a lever 16.

Lever 16 is shown in FIG. 3a in an initial position. By pulling lever 16 downward, the passenger is able to provide an emergency stop signal NH.

Based on the emergency stop signal NH, the vehicle is to perform an emergency stop.

Following the operation of lever 16, which is shown in FIG. 3b, an emergency switch 17 situated behind lever 16 is normally visible. If the passenger should be of the opinion that an emergency halt would be appropriate, the passenger is able to provide an emergency halt signal NS by operating the emergency switch 17, in this case in the form of a push button, whereupon the vehicle is forced to perform an emergency halt, normally by a full braking action. An emergency halt would be appropriate for example if an operation of lever 16 does not result in an emergency stop of the vehicle, for example due to an error or a manipulation of first control unit 12.

After executing the emergency halt and removing the emergency state, the control station releases the vehicle again by release signal FS. The passenger is prompted for example by a flashing emergency switch 17 to acknowledge the release of the control station, as is shown in FIG. 3c. By operating the flashing emergency switch 17, an acknowledgment signal QS is generated, which acknowledges release signal FS. Emergency switch 17 is preferably designed in such a way that it is not possible to generate the acknowledgment signal QS via a remote control.

Figure 4:
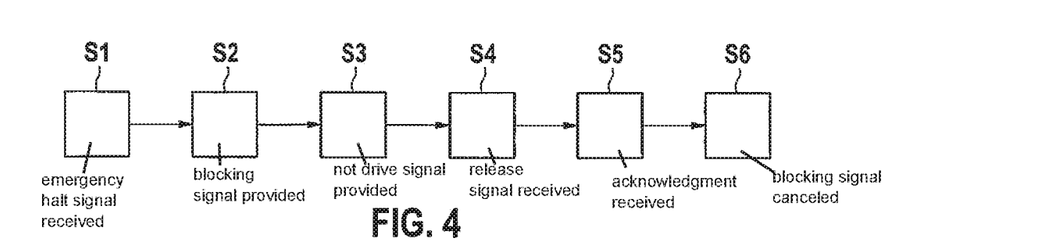
FIG. 4 shows a schematic representation of an emergency halt method.

FIG. 4 shows a schematic diagram of the emergency halt method.

In step S1, an emergency halt signal NS is received.

In step S2, a blocking signal SS is provided, first control unit 12 being blocked, and control over controlling driving maneuvers of the vehicle being withdrawn from first control unit 12.

In step S3, not-drive signal NDS is provided, an emergency halt driving maneuver of the vehicle being initiated.

In step S4, a release signal FS is received for releasing the blocked driving control unit.

In step S5, an acknowledgment signal QS is received for acknowledging release signal FS.

In step S6, blocking signal SS is canceled, first control unit 12 being released in the process and first control unit 12 being given control over controlling the driving maneuvers of the vehicle.

What is claimed is:

1. A method for a vehicle driving at least partially in automated fashion, the method comprising the following steps:

receiving a first user-input emergency stop signal;

responsive to the first emergency stop signal, a first processor starting a first braking maneuver of an autonomous vehicle control and which is determined by the first processor to bring the vehicle to a safe state and then to a full stop in the safe state;

during the first braking maneuver started in response to the first emergency stop signal and prior to the vehicle achieving the full stop in the safe state, receiving a second user-input emergency stop signal;

responsive to the second emergency stop signal:

a second processor issuing a blocking signal that blocks continued operations by the first processor, thereby preventing the first processor from continuing to be able to control the vehicle, which thereby halts the first braking maneuver; and the second processor performing a second braking maneuver of an autonomous vehicle control and that brings the vehicle to a full stop immediately, prior to the vehicle reaching the safe state by providing a not-drive signal;

subsequent to the vehicle being brought to the full stop after the start of the first braking maneuver, receiving from a control station that is remote from the vehicle a request for a user-input acknowledgement of a lack of a hazard, the request being sent by the control station in response to a determination, obtained after the vehicle has been brought to the full stop, that a driving of the vehicle is not being prevented by any hazard; and responding to the request by transmitting the user-input acknowledgement to the control station;

wherein:

the first processor is configured to complete the first braking maneuver when the second emergency stop signal is not received during the first braking maneuver, thereby bringing the vehicle to the full stop in the safe state; and the control station is configured to:

responsive to receiving the user-input acknowledgement from the vehicle, control the first processor to perform a control that drives the vehicle out of the full stop obtained immediately in response to the receipt of the second emergency stop signal; and subsequent to the vehicle being brought to the full stop in the safe state by the completion of the first braking maneuver without receiving the second emergency stop signal, control the first processor to perform the control that drives the vehicle out of the full stop obtained in the safe state.

2. The method as recited in claim 1, wherein the second emergency stop signal is provided by a passenger of the vehicle using an input device of the vehicle.

3. The method as recited in claim 1, further comprising:
subsequent to the vehicle being brought to a braked state by the second braking maneuver, in response to a determination of the lack of any hazard preventing the driving of the vehicle, outputting to a user of the vehicle a request for the acknowledgement of the lack of the hazard.

4. The method as recited in claim 3, wherein the control station is configured to, responsive to not receiving the acknowledgement subsequent to the output of the request, initiate a resolution of an emergency state of the vehicle.

5. The method as recited in claim 1, wherein the control station is configured to, subsequent to the vehicle being brought to a braked state by the second braking maneuver, in response to a determination of presence of a hazard preventing a driving of the vehicle, send technical staff to the vehicle to clear the hazard.

6. The method as recited in claim 1, wherein:
the first emergency stop signal is received by a manual operation of a first input;
the manual operation of the first input, which causes the first emergency stop signal to be received, exposes a second input to manual operation; and
the second emergency stop signal is received by the manual operation of the second input.

7. The method as recited in claim 6, wherein the second input is a button, the first input is a lever, and the manual operation of the first input is a shift of the lever from a first position in which the lever covers the button to a second position in which the lever does not cover the button.

8. A system comprising:
a drive controlling unit of a vehicle driving at least partially in automated fashion, the drive controlling unit including a first processor and a second processor; and
a control station that is remote from the vehicle;
wherein:
the drive controlling unit is configured to perform a method, the method comprising:
receiving a first user-input emergency stop signal;
responsive to the first emergency stop signal, the first processor starting a first braking maneuver of an autonomous vehicle control and which is determined by the first processor to bring the vehicle to a safe state and then to a full stop in the safe state;
during the first braking maneuver started in response to the first emergency stop signal and prior to the vehicle achieving the full stop in the safe state, receiving a second user-input emergency stop signal; and
responsive to the second emergency stop signal:
the second processor issuing a blocking signal that blocks continued operations by the first processor, thereby preventing the first processor from continuing to be able to control the vehicle, which thereby halts the first braking maneuver; and
the second processor performing a second braking maneuver of an autonomous vehicle control and that brings the vehicle to a full stop immediately, prior to the vehicle reaching the safe state by providing a not-drive signal;

the drive controlling unit is further configured to complete the first braking maneuver when the second emergency stop signal is not received during the first braking maneuver, thereby bringing the vehicle to the full stop in the safe state; and
the control station is configured to, subsequent to the vehicle being brought to the full stop after the start of the first braking maneuver, either with or without receiving the second emergency stop signal, in response to a determination that a driving of the vehicle is not being prevented by any hazard:
where the determination is obtained after the vehicle is brought to the full stop in the safe state without receiving the second emergency stop signal, control the first processor of the drive controlling unit to perform a control that drives the vehicle out of the full stop obtained in the safe state; and
where the determination is obtained after the vehicle is brought to the full stop in response to receipt of the second emergency stop signal, transmit a request to the vehicle for a user-input acknowledgement of the lack of the hazard, and, responsive to receiving from the vehicle the user-input acknowledgement subsequent to the output of the request, perform the control of the first processor of the drive controlling unit to perform the control that drives the vehicle out of the full stop obtained immediately in response to the receipt of the second emergency stop signal.

9. The system as recited in claim 8, wherein the system is configured to, responsive to not receiving the acknowledgement subsequent to the output of the request, initiate a resolution of an emergency state of the vehicle.

10. The system as recited in claim 9, wherein the system is configured to, in response to the determination being that the driving of the vehicle is being prevented by the hazard, initiate the resolution of the emergency state of the vehicle.

11. The system as recited in claim 8, wherein the system is configured to, in response to the determination being that the driving of the vehicle is being prevented by the hazard, initiate a resolution of an emergency state of the vehicle.

12. A non-transitory computer-readable storage medium of a vehicle that drives at least partially in automated fashion, wherein a computer program (a) is stored on the storage medium, (b) is executable by first and second processors, and (c) when executed by the first and second processors, causes the first and second processors to perform a method, the method comprising the following steps:
receiving a first user-input emergency stop signal;
responsive to the first emergency stop signal, the first processor starting a first braking maneuver of an autonomous vehicle control and which is determined by the first processor to bring the vehicle to a safe state and then to a full stop in the safe state;
during the first braking maneuver started in response to the first emergency stop signal and prior to the vehicle achieving the full stop in the safe state, receiving a second user-input emergency stop signal;
responsive to the second emergency stop signal:
the second processor issuing a blocking signal that blocks continued operations by the first processor, thereby preventing the first processor from continuing to be able to control the vehicle, which thereby halts the first braking maneuver; and
the second processor performing a second braking maneuver of an autonomous vehicle control and that brings the vehicle to a full stop immediately, prior to the vehicle reaching the safe state by providing a not-drive signal;

subsequent to the vehicle being brought to the full stop after the start of the first braking maneuver, receiving from a control station that is remote from the vehicle a request for a user-input acknowledgement of a lack of a hazard, the request being sent by the control station in response to a determination, obtained after the vehicle has been brought to the full stop, that a driving of the vehicle is not being prevented by any hazard; and responding to the request by transmitting the user-input acknowledgement to the control station:

wherein:

the first processor is configured to complete the first braking maneuver when the second emergency stop signal is not received during the first braking maneuver, thereby bringing the vehicle to the full stop in the safe state; and the control station is configured to:

responsive to receiving the user-input acknowledgement from the vehicle, control the first processor to perform a control that drives the vehicle out of the full stop obtained immediately in response to the receipt of the second emergency stop signal; and subsequent to the vehicle being brought to the full stop in the safe state by the completion of the first braking maneuver without receiving the second emergency stop signal, control the first processor to perform the control that drives the vehicle out of the full stop obtained in the safe state.

* * * * *